United States Patent [19]
Yankielun et al.

[11] Patent Number: 5,790,471
[45] Date of Patent: Aug. 4, 1998

[54] WATER/SEDIMENT INTERFACE MONITORING SYSTEM USING FREQUENCY-MOLULATED CONTINUOUS WAVE

[75] Inventors: Norbert E. Yankielun, Lebanon, N.H.; Leonard J. Zabilansky, Perkinsville, Vt.

[73] Assignee: U.S. Army Corps of Engineers as represented by the Secretary of the Army, Washington, D.C.

[21] Appl. No.: 965,482

[22] Filed: Nov. 6, 1997

[51] Int. Cl.⁶ .................................................. H04B 17/00
[52] U.S. Cl. .......................................... 367/13; 367/131
[58] Field of Search ................... 367/131, 13; 73/304 R; 405/73; 33/719; 342/22; 324/533, 71.2

[56] References Cited

U.S. PATENT DOCUMENTS

| | | | |
|---|---|---|---|
| 2,707,267 | 4/1955 | Gavin | 324/533 |
| 3,617,996 | 11/1971 | Herbert | 367/105 |
| 3,686,887 | 8/1972 | Bruce | 405/74 |
| 3,727,128 | 4/1973 | McFerrin | 324/533 |
| 3,991,364 | 11/1976 | Wiznerowicz | 324/533 |
| 4,855,966 | 8/1989 | Cinquino | 367/99 |
| 4,914,394 | 4/1990 | Meyer | 324/534 |
| 5,032,794 | 7/1991 | Ridd et al. | 73/304 R |
| 5,361,776 | 11/1994 | Samuelson et al. | 200/547 |
| 5,479,724 | 1/1996 | Nahajski et al. | 73/290 R |
| 5,532,687 | 7/1996 | Richardson et al. | 340/870.33 |
| 5,554,936 | 9/1996 | Mohr | 324/642 |

*Primary Examiner*—Daniel T. Pihulic
*Attorney, Agent, or Firm*—Luther A. Marsh

[57] ABSTRACT

The water/sediment interface in a body of water near bridge piers and similar structures exposed to scour, is sensed and transformed by a frequency-modulated continuous wave method into an audio frequency signal that is related to the water/sediment interface elevation, which is transmitted by radio signal to a remote monitoring station. Radio signals received at the monitoring station are transmitted to a computer, which is programmed to compute the water/sediment interface elevation and to store such computed results for later use. A remote monitoring station may be equipped to monitor several water/sediment interface sensors.

8 Claims, 2 Drawing Sheets

WATER/SEDIMENT INTERFACE MONITORING SYSTEM USING FREQUENCY-MOLULATED CONTINUOUS WAVE

GOVERNMENT INTEREST STATEMENT

The invention described herein may be manufactured, licensed, and used by or for governmental purposes without the payment of any royalties thereon.

I. BACKGROUND OF THE INVENTION

1. Field of the Invention

This invention relates to a remote monitoring system for determining the sediment level in streams and rivers. Specifically, it relates to a sensor for measuring and transmitting to a remote monitoring station, the level of the water/sediment interface in streams and rivers near bridge piers and similar structures which are subject to the scouring action of shifting sediment.

Scour erodes foundation material surrounding and beneath bridge piers, utility crossings, and docks. It can create unsafe conditions including collapse. The costs of maintenance and repair on such structures owing to scour are high.

2. Prior Art

Radar and sonar have been employed to monitor scour; these techniques are not suited to continuous monitoring. Neutral buoyancy "fish" have been employed for scour monitoring; these are devices that are tethered to structures at selected elevations; they emit a radio signal when they are uncovered by the sediment movement. This technique is not highly accurate. Another technique employs sacrificial sensors, whose sections break off when exposed to scouring action. This technique requires replacement of the sensor after each scour event; it can signal only one scour event and, therefore, is costly and labor-intensive.

The water/sediment interface monitoring system of the present invention seeks to overcome the drawbacks of the techniques in the prior art.

II. SUMMARY OF THE INVENTION

In the water/sediment interface monitoring system of the present invention, the water/sediment interface elevation is detected by two or more vertical parallel transmission line probes which are placed in the sediment such that their lower ends are firmly embedded in dense sediment below the lowest expected water/sediment interface level. Depending on the extent to which the water/sediment interface shifts up and down due to the scouring action of the water, the upper ends of the probes may be surrounded by sediment or clear water. A frequency-modulated original signal is fed to the lower ends of the probes. Reflected signals are generated at the water/sediment interface and at the upper end of the probes. Mixing the original signals and reflected signals produces frequency difference signals, which are related to the distance traveled by the signals to the water/sediment interface and to the upper ends of the probes. Frequency difference signals are transmitted to a remote monitoring station by radio signal; the remote monitoring station comprises a radio receiver and a computer for calculating the water/sediment interface level and for storing this information for later use. The monitoring station is equipped to monitor several water/sediment interface sensors over a long period of time.

III. BRIEF DESCRIPTION OF THE DRAWINGS

IV. PREFERRED EMBODIMENT OF THE INVENTION

Figure 1:
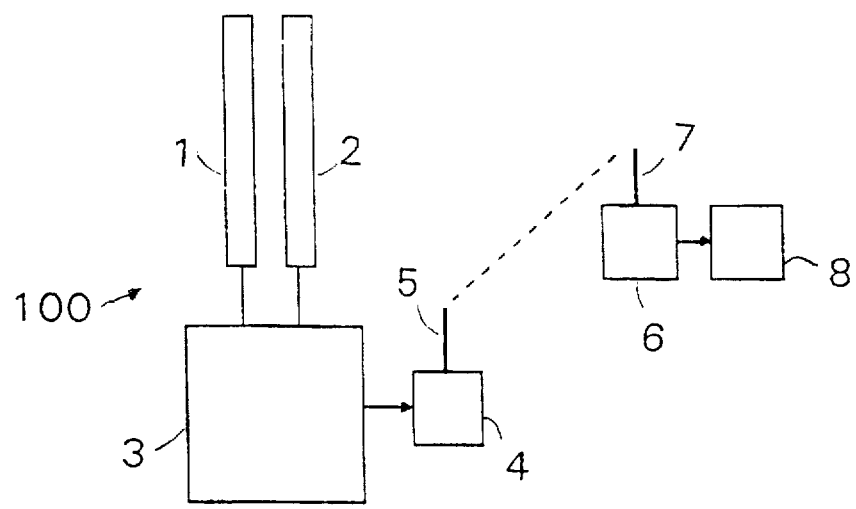
FIG. 1 is a schematic depiction of the elements of the water/sediment interface monitoring system of this invention.

With reference to FIG. 1, the water/sediment interface monitoring system 100 has two vertical transmission line probes 1 and 2, which are connected to a frequency-modulated signal generator 3, which is further connected to a radio transmitter 4. This transmitter sends audio frequency radio signals by means of its antenna 5 to the remote radio receiver 6, which has a receiving antenna 7. The components of the monitoring system which are placed in the river sediment, i.e. the probes, the signal generator and the transmitter, are herein referred to as water/sediment interface sensor.

The signals received by the radio receiver 6 are transmitted to a computer 8, which is programmed to calculate the distance between the bottom of the probes and the water/sediment interface, and for storing this information over a period of time. The radio receiver and computer at the monitoring station monitor the output of several interface sensors placed in the body of water.

Figure 2A:
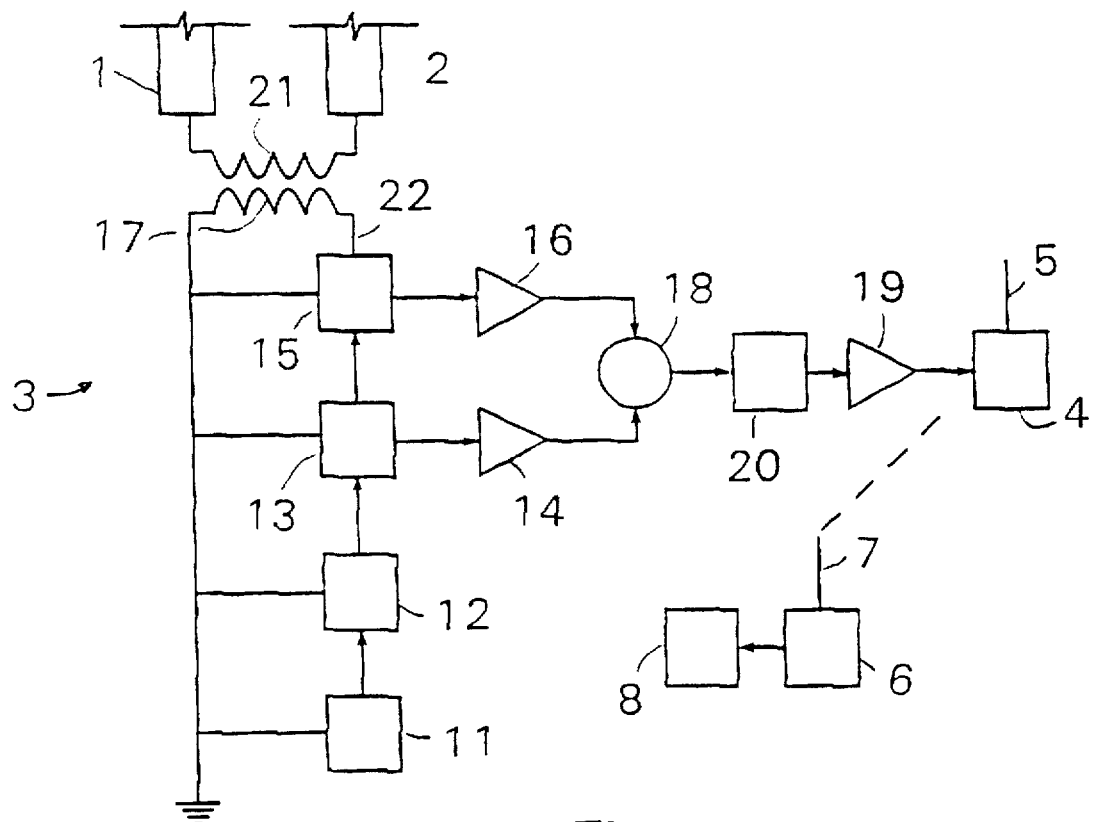
FIGS. 2a and 2b are simplified wiring diagrams illustrating two methods of connecting the components of the frequency-modulated signal generator, and their relation to the transmission line probes, the radio transmitter, the radio receiver, and the computer for calculating and storing data.

With reference to FIG. 2a, the frequency-modulated signal generator 3 comprises a timer 11, which periodically activates a voltage ramp generator 12. The voltage ramp generator 12 has a voltage output that varies linearly with time during a predetermined voltage sweep time interval, typically 10 to 250 milliseconds, preferably about 100 milliseconds. This voltage output is provided to a voltage-controlled oscillator 13. The output signal frequency of the oscillator 13 varies linearly with time, in response to the voltage signal it receives from the voltage ramp generator 12, from an initial frequency to a final frequency, typically from about 10 MHz to about 500 MHz. The difference between these two frequencies is referred to as the bandwidth.

The oscillator 13 provides a first voltage signal to a first radio frequency amplifier 14, and a second voltage signal to a circulator 15. The circulator 15 provides a third voltage signal to a second radio frequency amplifier 16, and a fourth voltage signal to one terminal, 22, of a transformer primary winding 17.

The transformer primary winding 17 has two terminals, one of which is grounded, and the other terminal, 22, herein identified as the hot terminal, receives the fourth voltage input signal from the circulator 15. The transformer primary winding 17 is electromagnetically coupled to the transformer secondary winding 21, which has two terminals, each being connected to the lower ends of one of the transmission line probes 1 and 2.

When a frequency-modulated voltage signal is generated by the oscillator 13, this signal is transmitted through the circulator 15 and the transformer rimary and secondary windings, 17 and 21, to the lower ends of the transmission line probes 1 and 2. This signal travels up along the probes 1 and 2 at a velocity equal to that of light in a vacuum divided by the refractive index of the substance, either water or sediment, until it reaches the tops of the probes. Reflected voltage signals are generated at the water/sediment interface and at the top of the probes. The reflected signals travel downward along the probes 1 and 2 and through the transformer secondary and primary windings, 21 and 17, back to the circulator 15 and to the second radio frequency amplifier 16.

The output signals of the first and second radio frequency amplifiers 14 and 16 are sent to a mixer 18, whose output signal contains signal frequency components of the frequency sums and differences of the signals received by the mixer 18 from the amplifiers 14 and 16.

The voltage output of the mixer 1 8 passes through a low-pass filter 20, which eliminates the frequency sum components of the voltage signals received from the mixer 18 but passes the frequency difference components on to an audio amplifier 19. The amplified voltage signals are provided to a radio transmitter 4 having a broadcast antenna 5. The voltage signals are broadcast to the receiving antenna 7 of the radio receiver 6. The signals thus received by the radio receiver 6 are provided to a computer 8, which calculates the distance between the top of the probes 1 and 2 and the water/sediment interface, based on the frequency difference signals, and stores calculated results as previously described.

Figure 2B:
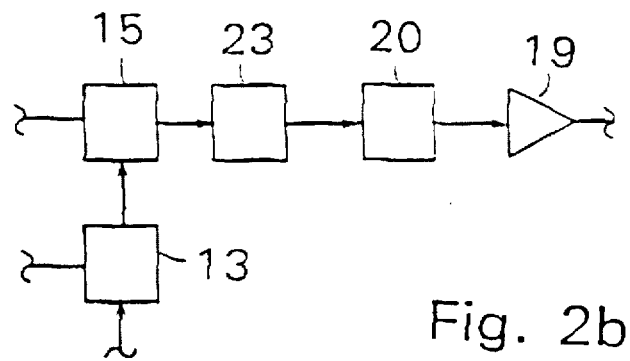

With reference to FIG. 2b, the above circuit may be simplified by elimination of the radio frequency amplifiers 14 and 1 6 and the mixer 18, and substitution of a diode detector 23, whose nonlinear electrical characteristics perform the same function as that of the system illustrated in FIG. 2a.

Figure 3:
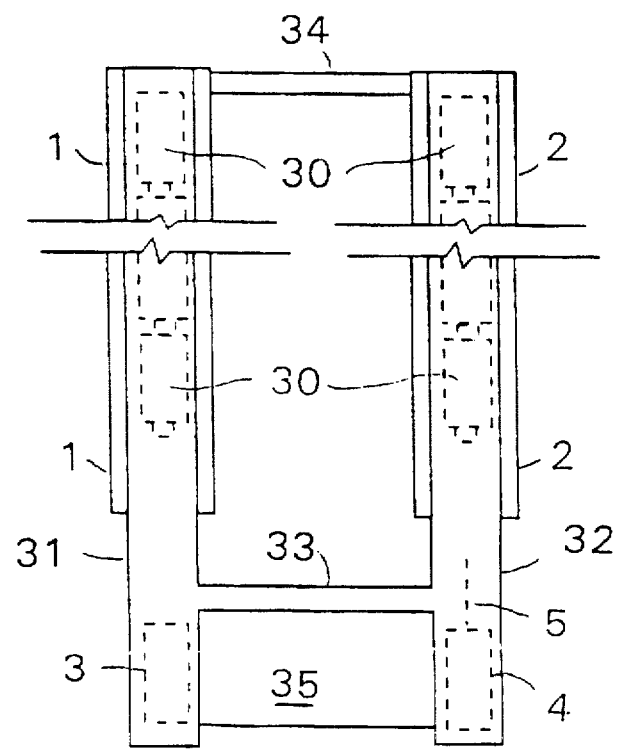
FIG. 3 is an elevational view of the water/sediment interface sensor showing one possible physical arrangement of the components of the apparatus of this invention.

With reference to FIG. 3, the transmission line probes 1 and 2 are in the form of hollow metal pipes. The hollow interior spaces of these pipes are utilized for the storage of dry batteries 30 for powering all the electrical components of the interface sensor system. The batteries 30 typically are housed in plastic tubes 31 and 32 sealed at their ends and cross-connected by a plastic tube 33. The tubular probes 1 and 2 fit snugly onto the plastic tubes 31 and 32.

Also installed in the plastic tubes 31 and 32 are the electrical components of the interface sensor, including the frequency-modulated signal generator 3 and the transmitter 4 with antenna 5. Interconnecting wiring between the probes, the frequency-modulated signal generator 3, and the radio transmitter 4 is passed through the plastic tube 33 (not illustrated).

The plastic, preferably, is fiberglass-reinforced for added mechanical strength. The structure may, optionally, be cross-braced by a member 34, though this is not preferred since it could cause entanglement of the sensor with debris. Optionally, a web plate 35 may be provided cross-connecting the plastic tubes 31 and 32, stiffening the structure and providing anchoring surface for embedding the lower portion of the interface sensor in stable sediment.

The transmission line probes may be exposed to the water and sediment. For corrosion protection, they should be made of stainless steel, galvanized steel, brass, or bronze. Alternatively, the transmission line probes may be covered by a thin protective film of plastic.

Optionally, several additional vertical parallel transmission probes may be used. For example, probe 2 may be replaced by two probes, positioned on opposing sides of probe 1, equidistantly spaced, and electrically connected in parallel (not illustrated). However, multiple probes are not preferred because they may lead to entanglement with debris floating in the water, which would falsify the water/sediment interface signal.

The operation of the interface sensor is illustrated by the following examples.

EXAMPLE 1

A water/sediment interface sensor in accordance with this invention is completely embedded in sediment. The length of the sensor is 1.50 m. The rate at which voltage signals travel along the transmission line probes is c/n, where c is the speed of light, $3 \times 10^8$ m/sec, and n is the refractive index of the material surrounding the probes, which for sediment typically is about 5.

The time interval of the frequency-modulated voltage signal generated by the signal generator is 100 millisecond= 0.1 seconds, the initial signal frequency is 10 MHz, and the final signal frequency is 500 MHz. The bandwidth thus is 490 MHz.

By considering the time required for the voltage signal to travel to the end of the probes and to be reflected, and the speed of signal propagation, one derives the relationship $$D = f_2 \times t_{swp} \times (c/n)/(2 \times BW), \tag{1}$$

where

D=length of sensor embedded in sediment, m, $f_2$=frequency of voltage signal obtained by mixing original and reflected voltage signals, $t_{swp}$=sweep time of frequency-modulated voltage signal, sec, c=speed of light, $3 \times 10^8$ m/sec, n=refractive index, approximately 5 for sediment, BW=bandwidth, MHz Since D is known (D=1.50 m), equation (1) may be solved for $f_2$, and it is found that $f_2$=245 Hz.

EXAMPLE 2

The water/sediment interface sensor is partially embedded in sediment; the upper portion of the sensor is in clear water. The water/sediment interface is at a distance D from the bottom of the sensor, and the upper portion of the sensor, having a length L, is in clear water, whose refractive index is about 9. Two signal frequencies are generated by mixing frequency modulated voltage signals with reflected signals, $f_1$ for reflection from the end of the probes, and $f_2$ for reflection at the water/sediment interface. By considering the time required for the voltage signal to travel through distance L, one derives the additional relationship $$L = (f_1 - f_2) \times t_{swp} \times (c/n)/(2 \times BW), \tag{2}$$

where

L=length of sensor in clear water, m, $f_1$, $f_2$=signals resulting from mixing of original and reflected voltage signals, $t_{swp}$=sweep time of frequency-modulated voltage signal, sec, c=speed of light, $3 \times 10^8$ m/sec, n=refractive index, approximately 9 for water, BW=bandwidth, MHz For the same bandwidth and sweep time as in Example 1, it is found that for $f_2$=133.9 Hz, $f_1$=153.9 Hz, L=0.69 m, and D=0.82 m.

The interface sensor is inserted vertically in the riverbed sediment by a capped large diameter pipe, typically 8 to 12"(20–30 cm) in diameter, into which the interface sensor is placed. Compressed air is fed to the pipe as it is lowered into the sediment. The displacement of sediment by the air stream creates a hole into which the interface sensor is lowered. When the air flow is stopped, sediment back-fills the hole around the interface sensor, whose bottom portion now is implanted in the sediment. This method of implanting interface sensors is known to the art; it is not part of this invention.

The dimensions of the interface sensors typically are as follows: length, 50 cm to 2 m; diameter of tubes, 30–50 mm; and spacing of tubes, 10–20 cm, center to center.

The foregoing is considered as illustrative of the principles of this invention. Numerous modifications and changes may occur to those skilled in the art. It is not desired to limit the invention to the exact construction as shown and described. Accordingly, all suitable modifications fall within the scope of this invention.

What is claimed is:

1. A water/sediment interface monitoring system placed below a water/sediment interface in a body of water comprising:
   a. two parallel, vertical transmission line probes;
   b. a frequency-modulated signal generator electrically connected to lower ends of the probes;
   c. a radio transmitter electrically connected to the signal generator and receiving an input signal therefrom and generating a radio signal; and
   d. a remote monitoring station having a radio receiver, for receiving the radio signal; and
   e. means at the remote monitoring station for computing from said radio signal, the distance of the water/sediment interface from the tops of the probes.

2. The monitoring system of claim 1 wherein the frequency-modulated signal generator comprises
   a. a timer;
   b. a voltage ramp generator which is periodically activated by the timer and which has a voltage output that varies linearly with time during a predetermined voltage sweep time interval;
   c. a voltage-controlled oscillator actuated by the voltage output of the voltage ramp generator;
   d. a first radio-frequency amplifier receiving a first signal from the oscillator;
   e. a circulator connected to the oscillator receiving a second signal from the oscillator and generating a third signal transmitted to a second radio-frequency amplifier and a fourth signal transmitted to a transformer primary winding;
   f. a transformer primary winding and, electromagnetically coupled therewith, a secondary winding with two terminals, which are each connected to the lower end of each of the probes;
   g. the second radio-frequency amplifier receiving said third voltage signal from the circulator;
   h. a mixer receiving two input signals, one each from the outputs of the first and second radio-frequency amplifiers and providing an output signal;
   i. a low-pass filter receiving the output signal of the mixer for filtering out undesired high-frequency voltage signal components; and
   j. an audio amplifier receiving the output signal of the low-pass filter.

3. The monitoring system of claim 1 wherein the frequency-modulated signal generator comprises
   a. a timer,
   b. a voltage ramp generator which is periodically activated by the timer and which has a voltage output that varies linearly with time during a predetermined voltage sweep time interval;
   c. a voltage-controlled oscillator actuated by the voltage output of the voltage ramp generator;
   d. a circulator receiving a signal from the oscillator and providing a first signal to a diode detector and a second signal to a terminal of a transformer primary winding;
   e. a transformer primary winding and, electromagnetically coupled therewith, a secondary winding with two terminals, which are each connected to the lower end of each of the probes;
   f. a diode detector receiving a first signal from the circulator;
   g. a low-pass filter receiving the output signal of the diode detector, for filtering out undesired high-frequency voltage signal components; and
   h. an audio amplifier receiving the output signal of the low-pass filter.

4. The monitoring system of claim 1 wherein the transmission line probes are hollow metal tubes.

5. The monitoring system of claim 4 wherein the transmission line probes snugly fit onto plastic tubes with closed ends in whose interior are stored dry batteries, the frequency-modulated signal generator, and the radio transmitter.

6. The monitoring system of claim 1 wherein the transmission line probes are made of a metal selected from the group consisting of stainless steel, brass, bronze, and galvanized steel.

7. The monitoring system of claim 1 wherein the transmission line probes are covered by a thin nonconducting coating.

8. The monitoring system of claim 1 wherein a plurality of transmission line probes surround one transmission line probe, parallel thereto, equidistant therefrom, and electrically connected in parallel.

* * * * *